J. M. WHITING.
Hub.
No 61,293.
Patented Jan. 15, 1867.
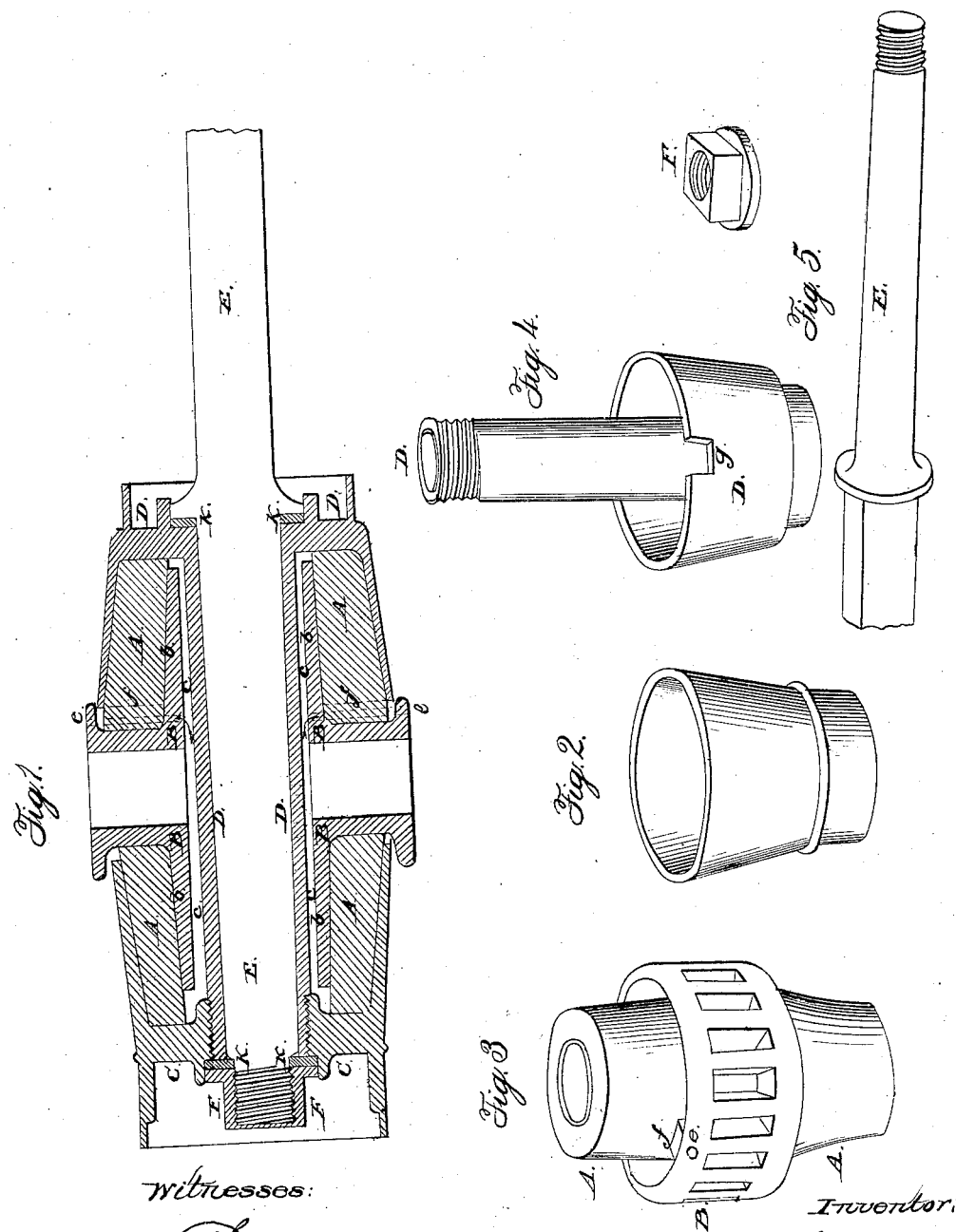

United States Patent Office.

JAMES M. WHITING, OF PROVIDENCE, RHODE ISLAND.

*Letters Patent No. 61,293, dated January 15, 1867.*

IMPROVEMENT IN CARRIAGE HUBS.

*The Schedule referred to in these Letters Patent and making part of the same.*

TO WHOM IT MAY CONCERN:

Be it known that I, JAMES M. WHITING, of the city and county of Providence, Rhode Island, have made certain Improvements in Carriage Hubs, which I denominate as a compound metallic elastic ventilated Hub; and in order that others skilled may understand the nature of my invention, I give the following description of it, illustrated by the accompanying drawings, referred to by the letters and figures marked thereon, and forming a part of this schedule.

Figure 1 is a view of all the parts together in longitudinal section.

B B, which is the central part of the hub, I make of bronze, or some similar metal, for the reason that, as this part receives the spokes, the same weight of metal is stronger than iron, and, as it is tougher and more elastic, allows the spokes to be driven in harder without danger of fracture, and also because this metal will not rust around the spokes. It will be perceived that this bronze part is prolonged on each side of the central part (where the mortises are made) into tubes or projections, $b\ b$. On these are tightly placed two collars or cylinders of hard rubber, or some other suitable elastic substance, A A. These are of a tapering form, whose largest diameter is in the portion nearest that part of the central piece which receives the spokes. These elastic collars are a little longer than the tubes or projections $b\ b$, in order to allow for compression without bringing the metal parts in contact endwise, as will be more fully explained further on. The above parts form the central portion of the hub for receiving the spokes, for mounting the disks or cylinders, and the elastic cylinders themselves. Over these rubber cylinders are slipped the sleeves C C and D D, made of the same taper that is given to the rubber. The sleeve D D is prolonged so as to form the axle-box, and is furnished with a male screw at its end, which fits into a female screw cut in the sleeve C C. It will be seen from this arrangement of the parts that, when the sleeve C C is turned to screw it up, both the sleeves are drawn together endwise, compressing the rubber cylinders both endwise, and also between the bronze tubes $b\ b$ and the interior inclined surfaces of the sleeves, thus making a firm bearing throughout the whole of the parts in contact, and without the intervention of any other nut and screw than those formed on the sleeves themselves, and giving, from the peculiar shape of the parts, the greatest amount of elastic packing possible without increasing the size of the hub or impairing its symmetrical form, thus interposing a great quantity of elastic substance to receive and break the concussions which take place on the rim of the carriage wheel, combined with great solidity. $k\ k$ represent leather washers. It will be seen now that between the axle-box D D and the bronze tubes or projections $b\ b$ there is an annular space $c\ c$, the object of which is to prevent the rubber from becoming softened and inelastic by the heating of the axle, which would be the case if the rubber was placed directly on the axle-box. This annular space $c\ c$ is ventilated by means of the holes $e\ e$, which are bored through the lips $f\ f$, shown by dotted lines on one side of the bronze part of the hub. These lips or projections perform two offices, viz, of allowing the ventilating holes to be made without weakening the hub, and to prevent one sleeve from turning round while the other is being screwed on or unscrewed; these lips on the bronze part fitting into two slots, $g\ g$, cut in the sleeve D D, shown in fig. 4.

Figure 3 shows the bronze part B B with the mortises for the spokes, the ventilating hole $e$, and also the tapering rubber cylinders.

A A, Figure 4, represents the sleeve D D and its prolongation forming the axle-box, as also the male screw on its end, which fits the thread cut in the sleeve C, Figure 2, and the slot $g$.

Figure 5 shows the axle with a male screw on its end, and F, just above it, is the nut which confines the axle-box to the axle.

The same letters represent the same parts in all the figures wherever they are necessarily shown.

It is here remarked that the rubber cylinder which fits that end of the bronze part provided with the lips or projections $f\ f$, should be cut out a little to allow the rubber to pass up to its proper bearing. It will be observed that this method of constructing a carriage hub has these peculiar and advantageous features: first, it allows the greatest amount of elastic packing possible without enlarging the hub externally; secondly, the compression of the elastic material is more thoroughly effected by the combination of end and side pressure than it would be by endwise pressure alone; thirdly, that no extra screws are necessary to produce this pressure other than those on the parts forming the hub; fourthly, the rubber is entirely protected from the grease of the axle-box, which, if it comes in contact, has a tendency to soften and agglutinize it, destroying or impairing its elasticity; fifthly, the ventilated air space, which prevents the heat of the axle-box from injuring the elastic cylinders. The greater strength of the bronze and its freedom from rust have already been alluded to. I am aware that elastic packing has been inserted in carriage hubs before, but I know of none in which the advantages above recited are combined, nor any in which the objections named do not more or less exist. Hence, while I do not claim broadly the insertion of an elastic substance between the axle-box and the body of the hub, what I do claim, is—

1. A carriage hub made with its central part for receiving the spokes and elastic cylinders of bronze, combined with the conical sleeves of iron, forming in two pieces the axle-box, and nut, for compressing the elastic cylinders and the external covering for these, and forming the two ends of the hub.

2. I claim the conical-shaped elastic cylinders or packing.

3. I claim the ventilated air space between the axle-box and the packing.

4. I claim the lips and slots for preventing the turning of the sleeve in screwing and unscrewing, with the holes giving access to the external air, all made and operating substantially as described, or their mechanical equivalents.

JAS. M. WHITING.

Witnesses:
  WM. C. SNOW,
  WILLIS W. WORK.